US009410586B2

(12) United States Patent
Esenwein

(10) Patent No.: US 9,410,586 B2
(45) Date of Patent: Aug. 9, 2016

(54) MACHINE TOOL BRAKING APPARATUS

(75) Inventor: Florian Esenwein, Leinfelden-Echterdingen (DE)

(73) Assignee: Robert Bosch GmbH, Stuttgart (DE)

(*) Notice: Subject to any disclaimer, the term of this patent is extended or adjusted under 35 U.S.C. 154(b) by 190 days.

(21) Appl. No.: 14/005,637

(22) PCT Filed: Feb. 6, 2012

(86) PCT No.: PCT/EP2012/051922
§ 371 (c)(1),
(2), (4) Date: Nov. 25, 2013

(87) PCT Pub. No.: WO2012/126666
PCT Pub. Date: Sep. 27, 2012

(65) Prior Publication Data
US 2014/0069756 A1 Mar. 13, 2014

(30) Foreign Application Priority Data
Mar. 18, 2011 (DE) .......... 10 2011 005 809

(51) Int. Cl.
B24B 55/00 (2006.01)
F16D 59/00 (2006.01)
F16D 51/42 (2006.01)
B25F 5/00 (2006.01)
B24B 23/02 (2006.01)
B24B 47/26 (2006.01)
B23Q 11/00 (2006.01)

(52) U.S. Cl.
CPC ............ F16D 51/42 (2013.01); B23Q 11/0092 (2013.01); B24B 23/02 (2013.01); B24B 23/028 (2013.01); B24B 47/26 (2013.01); B24B 55/00 (2013.01); B25F 5/00 (2013.01); B25F 5/001 (2013.01); F16D 59/00 (2013.01)

(58) Field of Classification Search
USPC ................ 188/324, 323, 185, 82.77
See application file for complete search history.

(56) References Cited

U.S. PATENT DOCUMENTS 1,017,126 A * 2/1912 Barenz ...................... 192/104 C
2,139,763 A * 12/1938 Martin .......................... 188/184
2,174,529 A * 10/1939 Proctor ......................... 352/182

(Continued)

FOREIGN PATENT DOCUMENTS

CN 2717104 Y 8/2005
CN 2768425 Y 4/2006

(Continued)

OTHER PUBLICATIONS

International Search Report corresponding to PCT Application No. PCT/EP2012/051922, mailed Jun. 27, 2012 (German and English language document) (5 pages).

Primary Examiner — Robert A Siconolfi
Assistant Examiner — James Hsiao
(74) Attorney, Agent, or Firm — Maginot, Moore & Beck LLP

(57) ABSTRACT

A machine tool braking apparatus, in particular a hand-held machine tool braking apparatus, of a portable machine tool, includes at least one mechanical braking unit that has at least one movably mounted braking element and includes at least one output unit that has at least one output element. The braking unit includes at least one actuating element that is intended to move the braking element, at least in one operating state, at least substantially perpendicular to an axis of rotation of the output element.

18 Claims, 8 Drawing Sheets

(56) References Cited

U.S. PATENT DOCUMENTS

| | | | |
|---|---|---|---|
| 2,388,946 A * | 11/1945 | Beall | 188/184 |
| 2,451,373 A * | 10/1948 | Beall | 49/138 |
| 3,645,363 A | 2/1972 | Fuths | |
| 3,738,456 A * | 6/1973 | Russell et al. | 188/184 |
| 3,810,533 A * | 5/1974 | Densow | 192/105 BA |
| 3,954,162 A * | 5/1976 | Densow | 192/105 CE |
| 3,982,616 A * | 9/1976 | Bidanset | 192/104 C |
| 4,158,307 A * | 6/1979 | Schwager | 73/535 |
| 4,195,721 A * | 4/1980 | Shea | 192/105 CD |
| 4,294,342 A * | 10/1981 | St. John | 192/105 CD |
| 4,687,085 A * | 8/1987 | Shimizu et al. | 192/104 C |
| 4,700,816 A * | 10/1987 | Rath | 188/323 |
| 4,856,623 A * | 8/1989 | Romig, Jr. | 188/180 |
| 5,086,657 A * | 2/1992 | Wang et al. | 74/7 C |
| 5,673,773 A * | 10/1997 | Lai | 188/24.17 |
| 5,845,757 A * | 12/1998 | Csonka | 192/105 BA |
| 5,921,364 A * | 7/1999 | Kobayashi | 192/105 BA |
| 5,967,443 A * | 10/1999 | Green | 242/381.5 |
| 6,253,896 B1 * | 7/2001 | Notaras et al. | 192/105 CD |
| 7,021,446 B2 * | 4/2006 | Edwards et al. | 192/105 BA |
| 7,140,475 B1 * | 11/2006 | Appelqvist | 188/186 |
| 2004/0103544 A1 | 6/2004 | Hartmann | |
| 2011/0094835 A1 * | 4/2011 | Winkler | 188/78 |

FOREIGN PATENT DOCUMENTS

| | | |
|---|---|---|
| DE | 37 22 629 A1 | 1/1989 |
| DE | 195 10 291 A1 | 9/1996 |
| DE | 100 40 332 A1 | 2/2002 |
| EP | 1 470 882 A1 | 10/2004 |

* cited by examiner

MACHINE TOOL BRAKING APPARATUS

This application is a 35 U.S.C. §371 National Stage Application of PCT/EP2012/051922, filed on Feb. 6, 2012, which claims the benefit of priority to Serial No. DE 10 2011 005 809.5, filed on Mar. 18, 2011 in Germany, the disclosures of which are incorporated herein by reference in their entirety.

BACKGROUND

There is already known from DE 195 10 291 C2 a power-tool braking device of a portable power tool that has a mechanical braking unit and an output unit. In that case, the braking unit comprises a movably mounted braking element, and the output unit comprises an output element.

SUMMARY

The disclosure is based on a power-tool braking device, in particular a hand-held power-tool braking device, of a portable power tool, comprising at least one mechanical braking unit, which has at least one movably mounted braking element, and comprising at least one output unit, which has at least one output element.

It is proposed that the braking unit have at least one actuating element, which is provided to move the braking element, at least in one operating state, at least substantially perpendicularly in relation to a rotation axis of the output element. Particularly preferably, the braking unit is provided to brake, upon switch-off of the portable power tool, a rotational motion resulting from mass moments of inertia of an output shaft of the output unit, in particular of a spindle, and/or of a working tool mounted on the output shaft. A "portable power tool" is to be understood here to mean, in particular, a power tool, in particular a hand-held power tool, that can be transported by an operator without the use of a transport machine. The portable power tool has, in particular, a mass of less than 50 kg, preferably less than 20 kg, and particularly preferably less than 10 kg. The expression "mechanical braking unit" is intended here to define, in particular, a braking unit provided to put braking elements of the braking unit into a braking position and/or into a release position, as a result of a moment of inertia and/or as a result of a drive moment, in particular decoupled from a magnetic force. A "braking position" is to be understood here to mean, in particular, a position of the braking element in which at least a braking force is exerted upon a moving component in order to reduce a speed of the moving component, in particular by at least more than 50%, preferably by at least more than 65%, and particularly preferably by at least more than 80%, at least in one operating state. The term "release position" is intended here to define, in particular, a position of the braking element in which an action of the braking force upon the moving component to reduce the speed is at least substantially prevented.

The mechanical braking unit is preferably provided to brake the component, starting from a working speed, in a period, in particular, greater than 0.1 s, preferably greater than 0.5 s, and particularly preferably less than 3 s, in particular to a speed that is less than 50% of the working speed, preferably less than 20% of the working speed, and particularly preferably to a speed of 0 m/s. The braking element in this case has at least one brake lining, which is fixed to the braking element. The brake lining may be fixed to the braking element by means of a form-fitting, force-fitting and/or materially bonded connection, such as, for example, an adhesive connection, a riveted connection, a screwed connection or a connection produced by means of a sintering operation or by means of an injection molding method, etc. The brake lining in this case may be realized as a sintered brake lining, as an organic brake lining, as a brake lining made of carbon, as a brake lining made of ceramic, or as another brake lining considered appropriate by persons skilled in the art. Advantageously, the braking element is mounted so as to be movable relative to an output shaft of the output unit, in particular a spindle, in particular mounted so as to be rotatable about a rotation axis of the output shaft, by an angle greater than 2°, preferably greater than 5°, and particularly preferably less than 45°. The expression "mounted so as to be movable" is intended here to define, in particular, a mounting of the braking element, wherein the braking element, in particular decoupled from an elastic deformation of the braking element, has a capability to move along at least a travel distance greater than 1 mm, preferably greater than 10 mm, and particularly preferably greater than 50 mm, and/or a capability to move about at least one axis by an angle greater than 5°, preferably greater than 20°, and particularly preferably less than 45°. Particularly preferably, the braking element is mounted so as to be movable, at least relative to the actuating element.

An "output unit" is to be understood here to mean, in particular, a unit that can be driven by means of a drive unit of the portable power tool and that transmits forces and/or torques, generated by the drive unit, to a working tool. Preferably, the output element of the output unit is realized as a gearwheel. Particularly preferably, the output element is realized as a ring gear. It is also conceivable, however, for the output element to be of another design, considered appropriate by persons skilled in the art, such as, for example, being designed as a shaft, etc. The output unit is preferably realized as a bevel gear transmission. A "bevel gear transmission" is to be understood here to mean, in particular, a transmission having an output shaft disposed with an angular offset relative to an input shaft, the rotation axes of the input shaft and output shaft preferably having a common point of intersection. "Disposed with an angular offset" is to be understood here to mean, in particular, a disposition of an axis relative to a further axis, in particular of two intersecting axes, wherein the two axes enclose an angle other than 180°. Preferably, when the output unit, realized as a bevel gear transmission, is in an assembled state, a rotation axis of the input shaft and a rotation axis of the output shaft enclose an angle of 90°. An "input shaft" is to be understood here to mean, in particular, a shaft that introduces forces and/or torques into the output unit realized as a bevel gear transmission. An "output shaft" is to be understood here to mean, in particular, a shaft, in particular a spindle of the output unit, that transmits forces and/or torques to, for example, a working tool that is connected to the output shaft in a rotationally fixed manner. "Rotationally fixed" is to be understood to mean, in particular, a connection that transmits a torque and/or a rotational motion at least substantially without change. "Transmit at least substantially without change" is to be understood here to mean, in particular, a transmission of forces and/or torques, from one component to a further component, that is complete apart from a loss resulting from friction and/or tolerances. "Substantially perpendicularly" is to be understood here to mean, in particular, an alignment of a direction relative to a reference direction, the direction and the relative direction, in particular as viewed in one plane, enclosing an angle of 90° and the angle having a maximum deviation of, in particular, less than 8°, advantageously less than 5°, and particularly advantageously less than 2°. The design of the power-tool braking device according to the disclosure enables a braking force for braking a moving component, in particular the output-unit output shaft, realized as a spindle, to be generated through simple design means. Advantageously, therefore, a rotational motion resulting from moments of mass inertia of a tool can be braked upon switch-off of the portable power tool.

Furthermore, it is proposed that the actuating element, at least in one operating state, act in combination, in a form-fitting manner, with a release element of the braking element. Preferably, the release element is provided, by acting in combination with the actuating element, to hold the braking element in a release position and/or in a braking position, and/or to move the braking element into a release position and/or into a braking position, in particular on a motion path defined by the combined action of the actuating element and the release element. Preferably, the release element and the actuating element engage mutually, at least in one operating state. Particularly preferably, the actuating element in this case is realized as a hook-shaped extension, which is provided to act in combination, in a form-fitting manner, with the release element, which is realized so as to correspond to the hook-shaped extension. In an alternative design of the power-tool braking device, the actuating element engages in the release element, at least in one operating state. It is also conceivable, however, for the release element to engage in the actuating element, at least in one operating state. Preferably, the release element is integral with the braking element. "Integral with" is to be understood to mean, in particular, connected at least in a materially bonded manner, for example by a welding process, an adhesive bonding process, an injection process and/or by another process considered appropriate by persons skilled in the art, and/or, advantageously, formed in one piece, such as, for example, by being produced from a casting and/or by being produced in a single- or multi-component injection process and, advantageously, from a single blank. It is also conceivable, however, for the release element to be connected to the braking element by means of a form-fitting and/or force-fitting connection. Advantageously, it is possible to achieve reliable holding of the braking element in a release position in which action of a braking force is prevented.

Preferably, the actuating element is connected to the output element in a rotationally fixed manner. Preferably, the actuating element is integral with the output element. In an alternative design, the actuating element is connected to the output element in a rotationally fixed manner by means of a screwed connection. It is also conceivable, however, for the actuating element to be connected to the output element by means of another form-fitting, force-fitting and/or materially bonded connection, considered appropriate by persons skilled in the art, such as, for example, an adhesive connection, a riveted connection, a screwed connection or a connection produced by means of a sintering operation or by means of an injection molding method, etc. A motion of the braking element by means of the actuating element, in dependence on a motion of the output element, can be achieved through simple design means. Advantageously, therefore, in the case of an interruption of a transmission of torque to the output element, a relative motion of the output element, relative to an output shaft of the output unit, in particular a spindle, can be used to move the braking element. Advantageously, it is possible to dispense with electrical and/or electronic components for moving the braking element.

Further, it is proposed that the braking unit have at least one driver element, on which the braking element is pivotally mounted. Preferably, the driver element is connected in a rotationally fixed manner to an output shaft of the output unit, in particular to a spindle. Thus, the driver element, together with the output shaft, is preferably mounted so as to be movable relative to the output element. The braking element is advantageously realized as a brake lever, which, at one end, is pivotally mounted on the driver element. By means of a spring element of the braking unit, the braking element can be biased, relative to the driver element, in the direction of a release position and/or in the direction of a braking position. The spring element in this case may be realized as a compression spring, as a tension spring, as a torsion spring, as a leaf spring, as a strip spring, or as another spring element considered appropriate by persons skilled in the art. Through simple design means, a centrifugal force can be used to move the braking element into a braking position and/or into a release position of the braking element.

Advantageously, the braking unit has at least one counter-braking element, which at least partially surrounds the braking element along a circumferential direction, as viewed in a plane running perpendicularly in relation to the rotation axis of the output element. Particularly preferably, the counter-braking element is provided, by acting in combination with the braking element, to convert an energy of motion, in particular an energy of motion of the spindle moving relative to the counter-braking element, and/or an energy of motion of the braking element moving relative to the counter-braking element, into a thermal energy. In this case, for the purpose of generating a braking force that counteracts a rotational motion of the spindle, the braking element and the counter-braking element are brought into direct contact with each other. The counter-braking element in this case may be composed of sintered bronze, steel, nitrided steel, aluminum or another surface-treated steel and/or metal. The mechanical braking unit is therefore preferably realized as a frictional brake. By means of combined action of the braking element and the counter-braking element, a braking force can be achieved through simple design means.

Preferably, the counter-braking element is realized as a brake drum. Particularly preferably, the brake drum is of a cylindrical shape, in particular on a side of the brake drum that faces toward the braking element. It is also conceivable, however, for the brake drum to be of another shape, considered appropriate by persons skilled in the art, such as, for example, conical, contra-conical, concave, convex, etc. Further, it is also conceivable for the brake drum to be of a perforated design and/or, on the side of the brake drum that faces toward the braking element, to have recesses, in the form of flutes or the like, which are provided to guide, for example, a lubricant away from a contact surface between the braking element and the brake drum. The brake drum, in particular the side of the brake drum that faces toward the braking element, extends, as viewed in the plane running perpendicularly in relation to the rotation axis of the output element, by 360° along the circumferential direction. Particularly preferably, the brake drum is disposed, fixed to the housing, in a bearing flange and/or in a transmission housing of the output unit. Advantageously, the brake drum is connected to the bearing flange and/or to the transmission housing by means of a force-fitting, form-fitting and/or materially bonded connection. It is likewise conceivable for a design of the bearing flange and/or of the transmission housing with the brake drum to be realized from, for example, a single casting. The bearing flange and/or the transmission housing can be produced from a metal, a metal alloy and/or a plastic. Preferably, the bearing flange and or the transmission housing is/are realized as a metal casting. Advantageously, a mechanical braking unit that is realized as a frictional brake can be constituted.

It is additionally proposed that the braking unit comprise at least one cam mechanism, which has at least one cam member provided to act in combination with the actuating element for the purpose of moving the braking element. A "cam mechanism" is to be understood here to mean, in particular, a mechanism that, as a result of a motion of the actuating element and as a result of acting in combination with the cam member, operates a component that, as a result, executes a motion defined by the combined action of the actuating element and the cam member. Preferably, the cam member is realized as a control recess. A "control recess" is to be understood here to mean, in particular, a material relief in which the actuating element engages for the purpose of generating a motion, wherein the actuating element and the control recess are movable, in particular relative to each other. By means of the cam mechanism, a defined motion path of the braking element can be achieved, in the case of a motion from a release position and/or from a braking position, through simple design means.

Preferably, the cam member is disposed on the braking element. Particularly preferably, in the alternative design of the power-tool braking device, the braking element is integral with the driver element. The braking element in this case, advantageously, by means of an elastic portion of the driver element and/or by means of a film hinge etc. that is integral with the braking element and the driver element, is mounted such that it can be pivoted relative to the driver element. Advantageously, a compact power-tool braking device can be achieved.

In a further alternative design, it is conceivable for the braking unit to be realized as a mountable module. The expression "mountable module" is intended here to define, in particular, an assembly of a unit whereby a plurality of components are pre-mounted and the unit can be mounted as a whole in a complete system, in particular in the portable power tool. The mountable module preferably has at least one fastening element, which is provided to detachably connect the mountable module to the complete system. Advantageously, the mountable module can be demounted from the complete system, in particular, with fewer than 10 fastening elements, preferably with fewer than 8 fastening elements, and particularly preferably with fewer than 5 fastening elements. Particularly preferably, the fastening elements are realized as screws. It is also conceivable, however, for the fastening elements to be realized as other elements, considered appropriate by persons skilled in the art, such as, for example, as quick-action clamping elements, fastening elements that can be actuated without tools, etc. Preferably, at least one function of the mountable module can be realized when demounted from the complete system. Particularly preferably, the mountable module can be demounted by an end user. The mountable module is therefore realized as an exchangeable unit, which can be replaced by a further mountable module, such as, for example, in the case of a defect of the mountable module or an expansion of function and/or change of function of the complete system. The design of the braking unit as a mountable module makes it possible, advantageously, to achieve a wide spectrum of application of the power-tool braking device. Moreover, integration into already existing portable power tools can be achieved through simple design means. Furthermore, advantageously, production costs can be kept low as a result.

The disclosure is additionally based on a portable power tool, in particular a portable hand-held power tool, having a power-tool braking device according to the disclosure, in particular having a hand-held power-tool braking device. The portable power tool in this case may be realized as an angle grinder, a drill, a hand-held circular saw, a chipping hammer and/or a hammer drill, etc. Advantageously, a safety function can be achieved for an operator of the portable power tool.

The power-tool braking device according to the disclosure and/or the portable power tool according to the disclosure in this case is/are not intended to be limited to the application and embodiment described above. In particular, the power-tool braking device according to the disclosure and/or the portable power tool according to the disclosure, for the purpose of implementing a functioning mode described herein, can have a number of individual elements, components and units that differs from a number stated herein.

BRIEF DESCRIPTION OF THE DRAWINGS

Further advantages are given by the following description of the drawings. The drawings show exemplary embodiments of the disclosure. The drawings, the description and the claims contain numerous features in combination. Persons skilled in the art will also expediently consider the features individually and combine them to create appropriate further combinations.

In the drawings.

DETAILED DESCRIPTION

Figure 1:
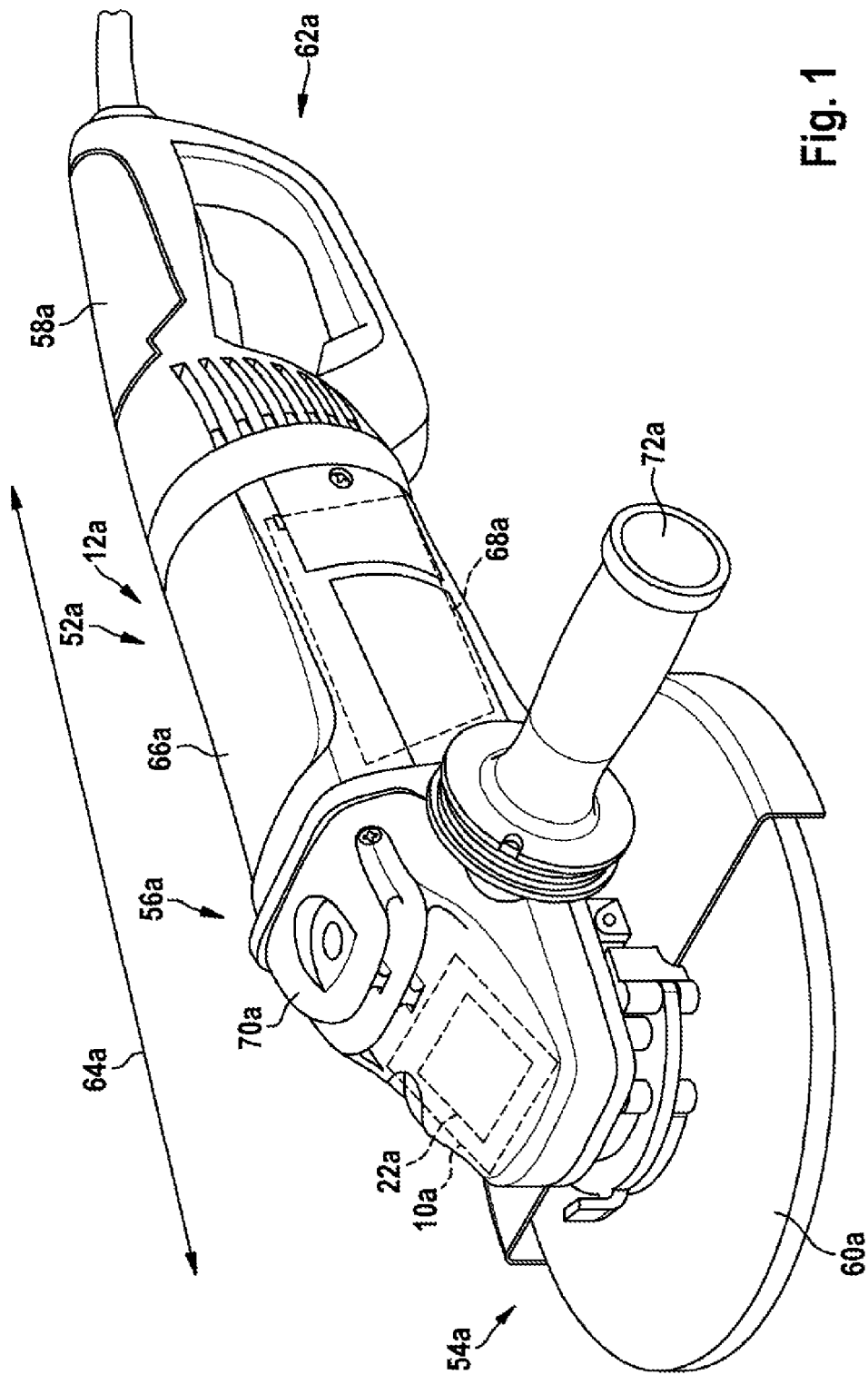
FIG. 1 shows a power tool according to the disclosure having a power-tool braking device according to the disclosure, in a schematic representation.
Figure 2:
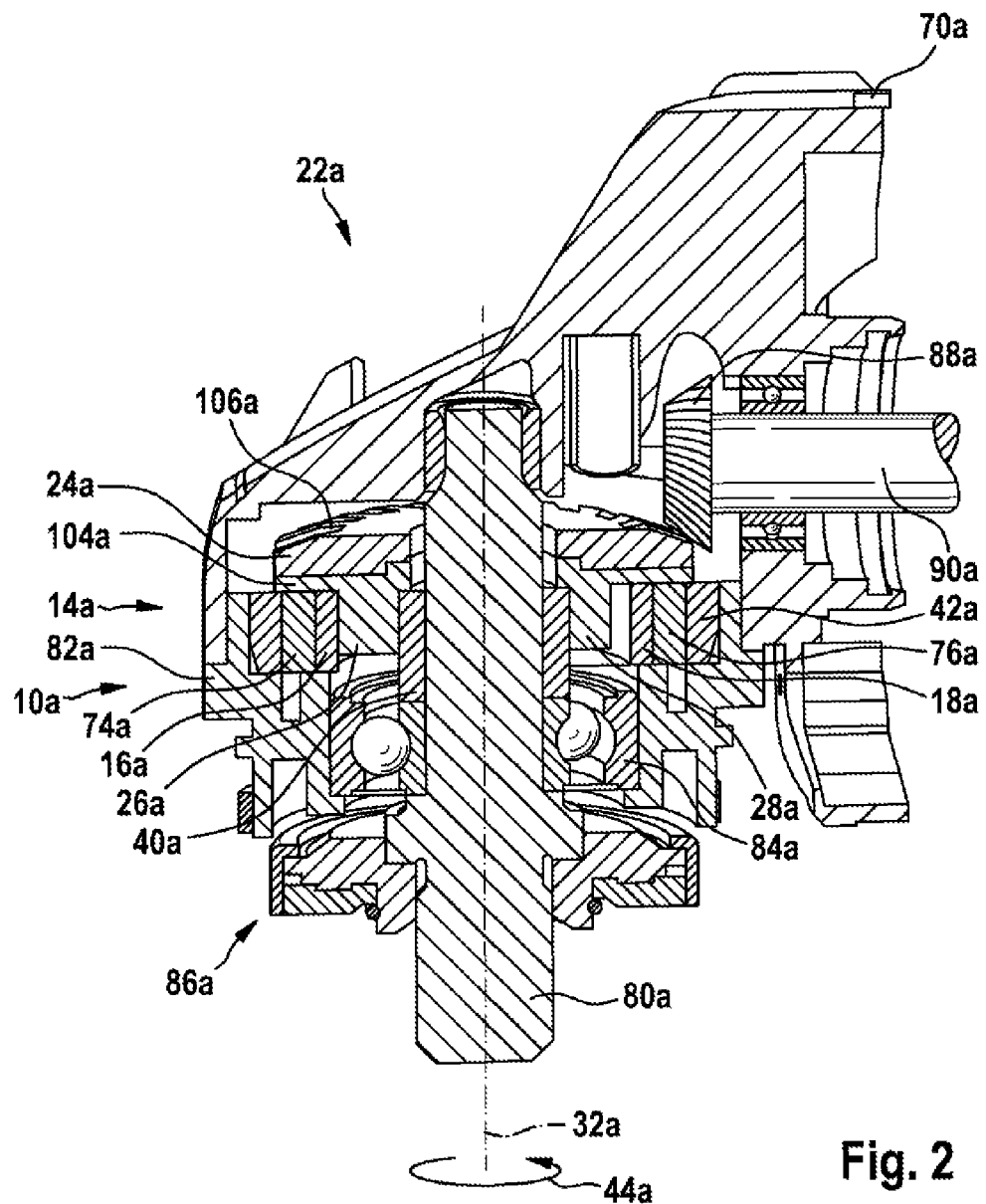
FIG. 2 shows a sectional view of a transmission housing, of the portable power tool according to the disclosure and of the power-tool braking device according to the disclosure, that has been demounted from a motor housing of the portable power tool according to the disclosure, in a schematic representation.

FIG. 1 shows a portable power tool 12a, realized as an angle grinder 52a, having a power-tool braking device 10a. The angle grinder 52a comprises a protective hood unit 54a, a power-tool housing 56a and a main handle 58a. From the power-tool housing 56a, the main handle 58a extends out, on a side 62a of the power-tool housing 56a that faces away from a working tool 60a, in a direction that faces away from the power-tool housing 56a and that runs at least substantially parallelwise in relation to a direction of main extent 64a of the angle grinder 52a. The working tool 60a in this case is realized as an abrasive disc. It is also conceivable, however, for the working tool 60a to be realized as a parting or polishing disc. The power-tool housing 56a comprises a motor housing 66a, for accommodating a drive unit 68a of the angle grinder 52a, and a transmission housing 70a, for accommodating an output unit 22a of the power-tool braking device 10a. The drive unit 68a is provided to drive the working tool 60a in rotation, via the output unit 22a. The output unit 22a is connected to the drive unit 68a, via a drive element 88a of the drive unit 68a that can be driven in rotation in a manner already known to persons skilled in the art. The drive element 88a is realized as a pinion gear, which is connected in a rotationally fixed manner to an armature shaft 90a of the drive unit 68a (FIG. 2). An ancillary handle 72a is disposed on the transmission housing 70a. The ancillary handle 72a extends transversely in relation to the direction of main extent 64a of the angle grinder 52a.

The power-tool braking device 10a is disposed on the transmission housing 70a of the angle grinder 52a (FIG. 2). A portion of the power-tool braking device 10a extends into the transmission housing 70a. A portion of the power-tool braking device 10a is therefore enclosed by the transmission housing 70a. The power-tool braking device 10a comprises a mechanical braking unit 14a, which has three movably mounted braking elements 16a, 18a, 20a (FIG. 3), and comprises the output unit 22a, which has an output element 24a. The output element 24a is realized as a ring gear. The output element 24a realized as a ring gear is disposed, by means of clearance fit, on a rotatably mounted output shaft of the output unit 22a, which output shaft is realized as a spindle 80a. The output unit 22a additionally comprises a bearing flange 82a and, disposed in the bearing flange 82a, a bearing element 84a for carrying the spindle 80a. The bearing flange 82a is detachably connected to the transmission housing 70a by means of fastening elements (not represented in greater detail here) of the output unit 22a. Moreover, the working tool 60a can be connected to the spindle 80a in a rotationally fixed manner by means of a fastening element (not represented in greater detail here), for the purpose of performing work on a workpiece. When the angle grinder 52a is in operation, therefore, the working tool 60a can be driven in rotation. The power-tool braking device 10a additionally has a run-off safety unit 86a, which is provided to prevent the working tool 60a, and/or the fastening element for fastening the working tool 60a, from running off the spindle 80a when the power-tool braking device 10a is in a braking mode. The run-off safety unit 86a in this case is realized as a receiving flange, which is connected to the spindle 80a in a rotationally fixed manner by means of a form-fit. It is also conceivable, however, for the run-off safety unit 86a to be connected to the spindle 80a in a rotationally fixed manner by means of other types of connection considered appropriate by persons skilled in the art.

Figure 3:
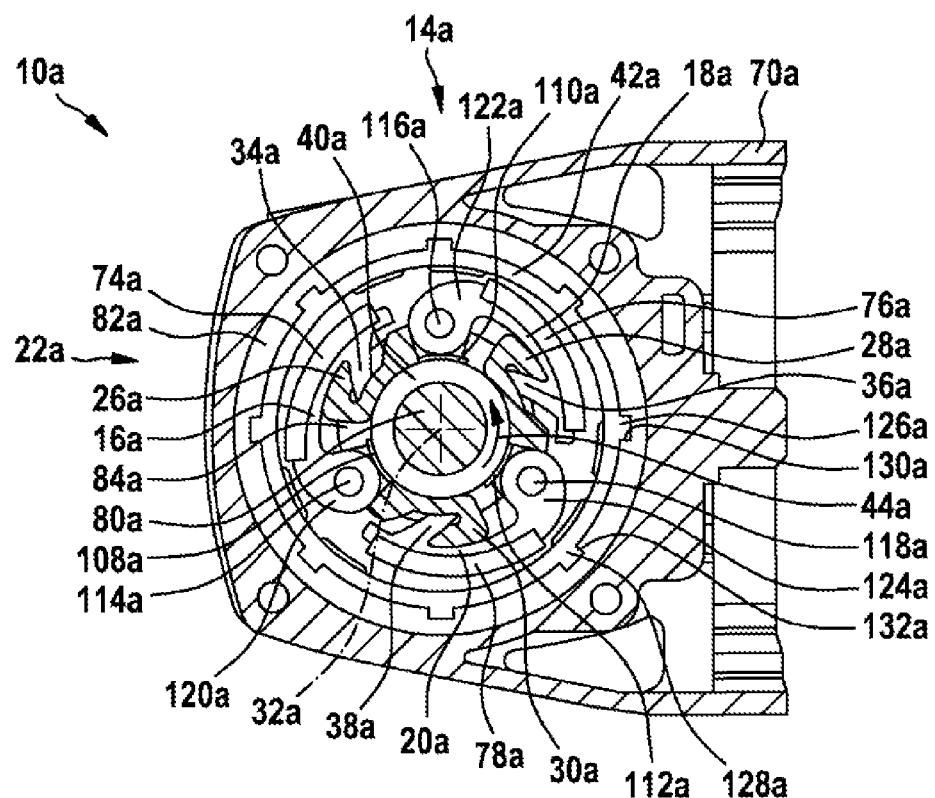
FIG. 3 shows a further sectional view of the transmission housing and of the power-tool braking device according to the disclosure, in a non-braked state, in a schematic representation.

The braking elements 16a, 18a, 20a of the braking unit 14a are each realized as brake levers (FIG. 3). In this case, the braking elements 16a, 18a, 20a are disposed in the bearing flange 82a of the output unit 22a. The braking elements 16a, 18a, 20a are disposed around the spindle 80a, being evenly distributed along a circumferential direction 44a. The circumferential direction 44a runs in a plane that extends perpendicularly in relation to a rotation axis 32a of the output element 24a realized as a ring gear. Each two of the three braking elements 16a, 18a, 20a that are disposed in series along the circumferential direction 44a are disposed at an equal distance from each other along the circumferential direction 44a. Moreover, the braking elements 16a, 18a, 20a each have a brake lining 74a, 76a, 78a. The brake linings 74a, 76a, 78a, as viewed along a direction running substantially perpendicularly in relation to the rotation axis 32a, are disposed on a side of the respective braking element 16a, 18a, 20a that faces away from the spindle 80a. The brake linings 74a, 76a, 78a in this case are connected to the respective braking element 16a, 18a, 20a by means of a form-fitting, force-fitting and/or materially bonded connection, in a manner already known to persons skilled in the art. In addition, the brake linings 74a, 76a, 78a, along the circumferential direction 44a and contrary to the circumferential direction 44a, in each case bear against a stop (not represented in greater detail here) of the respective braking element 16a, 18a, 20a, for the purpose of reliably transmitting shear forces and/or thrust forces.

Figure 5:
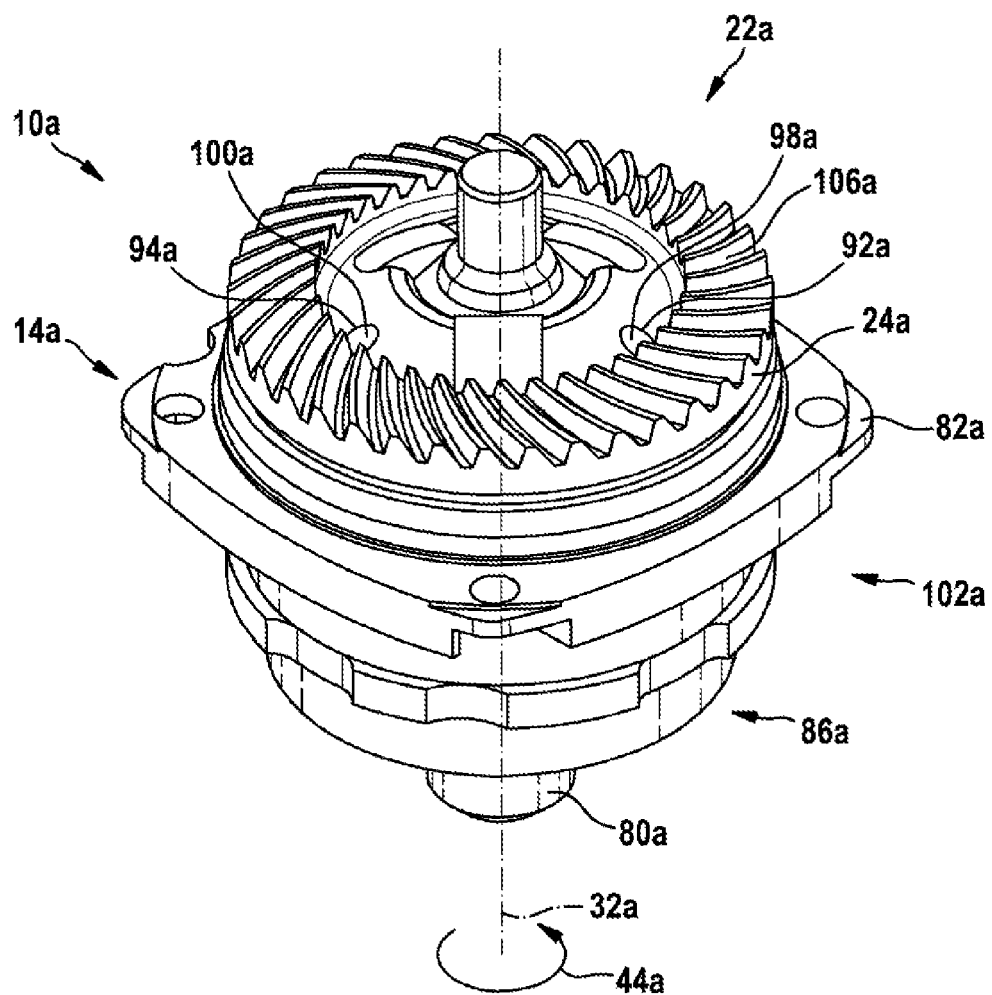
FIG. 5 shows a detail view of a braking unit of the power-tool braking device according to the disclosure, in a schematic representation.
Figure 6:
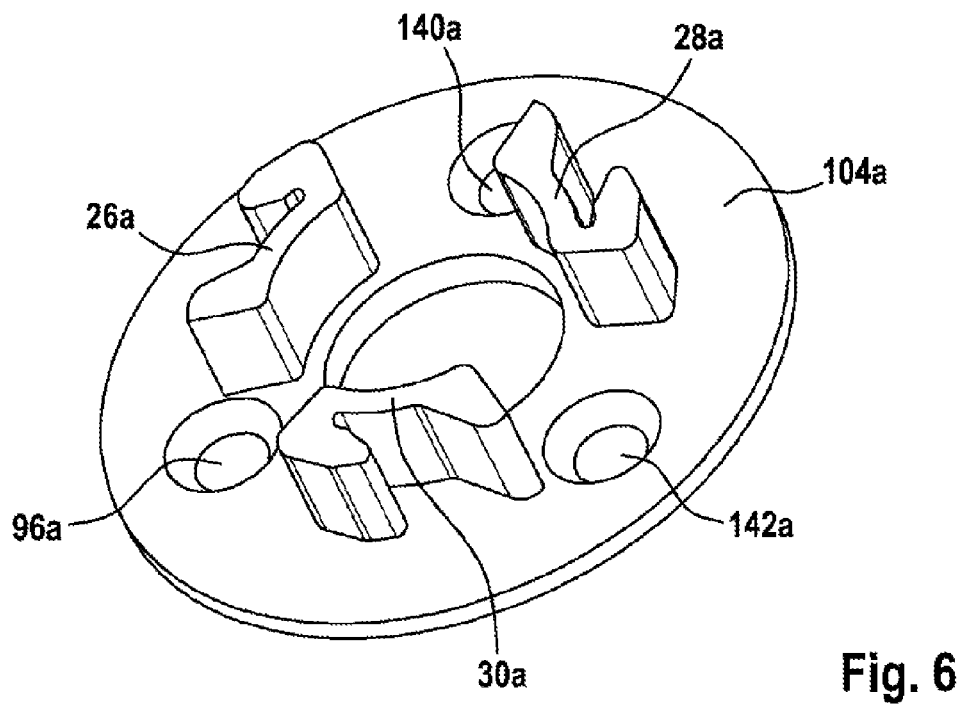
FIG. 6 shows a detail view of a mounting plate of the braking unit of the power-tool braking device according to the disclosure, in a schematic representation.

The braking unit 14a additionally has three actuating elements 26a, 28a, 30a (FIG. 3), which are provided to move the braking elements 16a, 18a, 20a, at least in one operating state, at least substantially perpendicularly in relation to the rotation axis 32a of the output element 24a realized as a ring gear. In this case, respectively one of the actuating elements 26a, 28a, 30a is assigned to respectively one of the braking elements 16a, 18a, 20a. The actuating elements 26a, 28a, 30a are connected in a rotationally fixed manner to the output element 24a realized as a ring gear. The output element 24a has three recesses 92a, 94a (only two are represented in FIG. 5), realized as threaded bores, which are provided to receive fastening elements 98a, 100a of the braking unit 14a, (only two are represented in FIG. 5), which are realized as screws, for fastening a mounting plate 104a of the braking unit 14a. The mounting plate 104a in this case has three recesses 96a, 140a, 142a, in which the fastening elements 98a, 100a are disposed when in a mounted state. The actuating elements 26a, 28a, 30a are integral with the mounting plate 104a (FIG. 6). Moreover, when in a mounted state, the actuating elements 26a, 28a, 30a, as viewed along the circumferential direction 44a, are disposed uniformly along the circumferential direction 44a, on the mounting plate 104a. The mounting plate 104a, when in a mounted state, is disposed on a side of the output element 24a that faces away from a toothing 106a of the output element 24a realized as a ring gear.

For the purpose of moving the braking elements 16a, 18a, 20a by means of the actuating elements 26a, 28a, 30a, the braking elements 16a, 18a, 20a have a respective operating element 34a, 36a, 38a. The operating elements 34a, 36a, 38a, as viewed along the direction running perpendicularly in relation to the rotation axis 32a of the output element 24a, are each disposed on a side of the braking elements 16a, 18a, 20a that faces toward the spindle 80a and faces toward the respective actuating element 26a, 28a, 30a. The actuating elements 26a, 28a, 30a have a hook-shaped configuration, for the purpose of working in combination with the operating elements 34a, 36a, 38a in a form-fitting manner. The operating elements 34a, 36a, 38a in this case have a hook-shaped configuration that corresponds to the hook-shaped configuration of the actuating elements 26a, 28a, 30a. The actuating elements 26a, 28a, 30a and the operating elements 34a, 36a, 38a therefore engage mutually, at least in one operating state.

Figure 7:
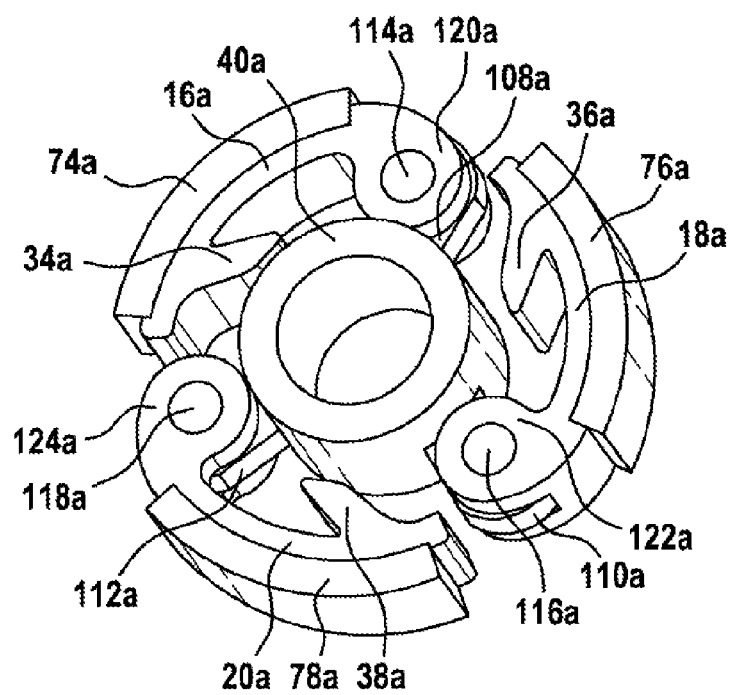
FIG. 7 shows a detail view of a driver element of the braking unit having, disposed thereon, braking elements of the braking unit of the power-tool braking device according to the disclosure, in a schematic representation.

In addition, the braking unit 14a has a driver element 40a, on which the braking elements 16a, 18a, 20a are pivotally mounted (FIG. 7). The driver element 40a, when in a mounted state, is connected to the spindle 80a in a rotationally fixed manner. For the purpose of mounting the braking elements 16a, 18a, 20a, the driver element 40a has three bearing extensions 108a, 110a, 112a, which extend along the direction running perpendicularly in relation to the rotation axis 32 of the output element 24a. The bearing extensions 108a, 110a, 112a are disposed, uniformly distributed along the circumferential direction 44a, on the driver element 40a. In addition, the bearing extensions 108a, 110a, 112a each have a recess for receiving a bearing element 114a, 116a, 118a of the braking unit 14a. The bearing elements 114a, 116a, 118a are realized as pins. For the purpose of pivotally mounting the braking elements 16a, 18a, 20a, the bearing elements 114a, 116a, 118a realized as pins engage in recesses of the braking elements 16a, 18a, 20a. The recesses of the braking elements 16a, 18a, 20a are disposed in bearing lugs 120a, 122a, 124a of the braking elements 16a, 18a, 20a. The bearing lugs 120a, 122a, 124a each have two portions in which there is disposed a respective recess of the braking elements 16a, 18a, 20a. In this case, the bearing extensions 108a, 110a, 112a, when in a mounted state, as viewed along the rotation axis 32a of the output element 24a, are each disposed between two portions of the bearing lugs 120a, 122a, 124a. The bearing elements 114a, 116a, 118a realized as pins, as viewed along the rotation axis 32a of the output element 24a, therefore extend through the recesses of the braking elements 16a, 18a, 20a that are disposed in the portions of the bearing lugs 120a, 122a, 124a, and through the recesses of the bearing extensions 108a, 110a, 112a. The bearing lugs 120a, 122a, 124a are each disposed at an end of the braking elements 16a, 18a, 20a. The braking elements 16a, 18a, 20a, at least in one operating state, can therefore each execute a pivoting motion about a longitudinal axis of the respective bearing element 114a, 116a, 118a, which longitudinal axis runs at least substantially parallelwise in relation to the rotation axis 32a of the output element 24a.

Furthermore, the braking unit 14a has a counter-braking element 42a (FIG. 3), which surrounds the braking elements 16a, 18a, 20a along the circumferential direction 44a, as viewed in the plane running perpendicularly in relation to the rotation axis 32a of the output element 24a. The counter-braking element 42a in this case is realized as a brake drum. In this case, the counter-braking element 42a is fixed in the bearing flange 82a of the output unit 22a by means of a form-fitting connection. For this purpose, the counter-braking element 42a has a multiplicity of form-fit elements 126a, 128a. The form-fit elements 126a, 128a are realized as extensions that, as viewed along the perpendicularly in relation to the rotation axis 32a of the output element 24a, are disposed on a side of the counter-braking element 42a that faces away from the braking elements 16a, 18a, 20a. For the purpose of fixing the counter-braking element 42a, the form-fit elements 126a, 128a, when in a mounted state, engage in connecting recesses 130a, 132a of the bearing flange 82a. It is also conceivable, however, for the counter-braking element 42a to be connected to the bearing flange 82a by means of another type of connection considered appropriate by persons skilled in the art, such as, for example, by means of a force-fitting and/or form-fitting connection. It is conceivable in this case for the counter-braking element 42a to be connected to the bearing flange 82a by means of, for example, a press fit and/or by means of an injection molding method.

When the angle grinder 52a is put into operation, the output element 24a realized as a ring gear is driven by means of the drive element 88a of the drive unit 68a, which drive element is realized as a pinion gear. The output element 24a in this case first moves relative to the driver element 40a that is connected to the spindle 80a in a rotationally fixed manner, until the actuating elements 26a, 28a, 30a come into engagement with the operating elements 34a, 36a, 38a, and the braking elements 16a, 18a, 20a consequently move, along the direction running perpendicularly in relation to the rotation direction 32a of the output element 24a, in the direction of the spindle 80a, into the release position of the braking elements 16a, 18a, 20a (FIG. 3). As a result of this, the braking elements 16a, 18a, 20a are moved away from the counter-braking element 42a. In addition, the actuating element 26a, 28a, 30a, owing to the motion relative to the driver element 40a, along the circumferential direction 44a, come to bear against sides of the bearing extensions 108a, 110a, 112a that face toward the actuating elements 26a, 28a, 30a along the circumferential direction 44a. As soon as the actuating elements 26a, 28a, 30a bear against the sides of the bearing extensions 108a, 110a, 112a that face toward the actuating elements 26a, 28a, 30a along the circumferential direction 44a, and the braking elements 16a, 18a, 20a have been moved away from the counter-braking element 42a, the braking elements 16a, 18a, 20a are in the release position. When the braking elements 16a, 18a, 20a are in the release position, direct contact between the braking elements 16a, 18a, 20a and the counter-braking element 42a is prevented (FIG. 3). As a result of the actuating elements 26a, 28a, 30a bearing against the bearing extensions 108a, 110a, 112a, and as a result of the actuating elements 16a, 18a, 20a engaging in the operating elements 34a, 36a, 38a, the rotational motion of the output element 24a is transmitted to the driver element 40a, and consequently to the spindle 80a. The output element 24a, the driver element 40a, the braking elements 16a, 18a, 20a disposed on the driver element 40a, and the spindle 80a rotate jointly about the rotation axis 32a of the output element 24a. Consequently, the braking elements 16a, 18a, 20a rotate relative to the counter-braking element 42a. Owing to the combined action of the output element 24a, driver element 40a and spindle 80a, the working tool 60a, which is connected to the spindle 80a in a rotationally fixed manner, is driven in rotation. Work can thus be performed on a workpiece by means of the working tool 60a.

Figure 4:
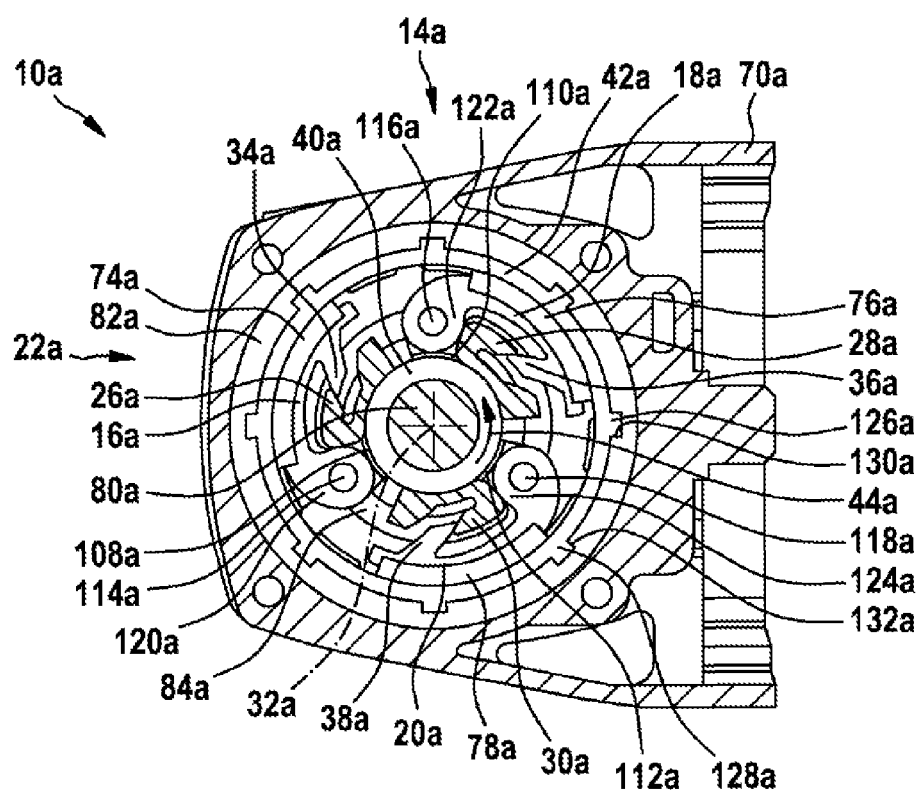
FIG. 4 shows a further sectional view of the transmission housing and of the power-tool braking device according to the disclosure, in a braked state, in a schematic representation.

Upon switch-off of the angle grinder 52a, the drive element 88a, realized as a pinion gear, is braked. The working tool 60a, which is fastened on the spindle 80a, continues to rotate because of a mass inertia. Consequently, the spindle 80a likewise continues to be rotated about the rotation axis 32a. The drive element 88a brakes the output element 24a that is realized as a ring gear. The output element 24a is rotated about the rotation axis 32a, relative to the driver element 40a, until, as a result of the relative motion, the actuating elements 26a, 28a, 30a strike against sides of the bearing extensions 108a, 110a, 112a that face toward the actuating elements 26a, 28a, 30a, contrary to the circumferential direction 44a (FIG. 4). During the relative motion of the output element 24a and driver element 40a, the actuating elements 26a, 28a, 30a become disengaged from the operating elements 36a, 38a, 40a. As a result of a centrifugal force, the braking elements 16a, 18a, 20a are moved, by means of the pivoted mounting, along the direction running perpendicularly in relation to the rotation direction 32a, in the direction of the counter-braking element 42a. It is additionally conceivable for the actuating elements 26a, 28a, 30a to assist a motion of the braking elements 16a, 18a, 20a in the direction of the counter-braking element 42a by means of ramp-type inclined surfaces that act in combination with the operating elements 34a, 36a, 38a. As a result of the motion of the braking elements 16a, 18a, 20a in the direction of the counter-braking element 42a, the brake linings 74a, 76a, 78a come into contact with the side of the counter-braking element 42a that faces toward the braking elements 16a, 18a, 20a. As a result of this, by means of a friction between the brake linings 74a, 76a, 78a and the counter-braking element 42a, a braking force is generated, for braking the spindle 80a and, consequently, the working tool 60a. The braking elements 16a, 18a, 20a are therefore in the braking position (FIG. 4). Owing to the fact that they are pivotally mounted, and owing to a frictional force that generates the braking force, the braking elements 16a, 18a, 20a become wedged between the driver element 40a and the counter-braking element 42a. The frictional force in this case seeks to pivot the braking elements 16a, 18a, 20a further in the direction of the counter-braking element 42a, relative to the driver element 40a. However, this further pivoting motion is prevented, as far as possible, by means of the direct contact between the brake linings 74a, 76a, 78a and the counter-braking element 42a. Consequently, the spindle 80a, and the working tool 60a, are braked to a standstill. When the angle grinder 52a is put into operation again, the combined action of the actuating elements 26a, 28a, 30a and operating elements 34a, 36a, 38a results in the braking elements 16a, 18a, 20a being reliably brought out of the braking position and into the release position.

The braking unit 14a, together with the output unit 22a, is realized as a mountable module 102a (FIG. 5). The mountable module 102a thus constitutes the power-tool braking device 10a. The mountable module 102a comprises four fastening elements (not represented here), realized as screws. The screws are provided for detachably connecting the mountable module 102a to the transmission housing 70a. If necessary, an operator can demount the mountable module 102a from the transmission housing 70a. The angle grinder 52a and the power-tool braking device 10a thus constitute a power-tool system. The power-tool system may comprise a further mountable module. The further mountable module may comprise, for example, an output unit realized as a bevel gear transmission. The further mountable module could be mounted on the transmission housing 70a by the operator, for example, as an alternative to the mountable module 102a. An operator therefore has the possibility of equipping the angle grinder 52a with the mountable module 102a that comprises the braking unit 14a and the output unit 22a, or with the further mountable module that comprises an output unit. For an application in which the angle grinder 52a is to be operated separately from the power-tool braking device 10a, an operator can replace the mountable module 102a by the further mountable module of the power-tool system. For this purpose, the operator merely demounts the mountable module 102a from the transmission housing 70a and mounts the further mountable module on the transmission housing 70a.

Alternative exemplary embodiments are represented in FIGS. 8 to 11. Components, features and functions that remain substantially the same are denoted by essentially the same references. To differentiate the exemplary embodiments, the letters a to c are appended to the references of the exemplary embodiments. The description that follows is limited essentially to the differences in respect of the first exemplary embodiment, described in FIGS. 1 to 7, and reference may be made to the description of the first exemplary embodiment in FIGS. 1 to 7 in respect of components, features and functions that remain the same.

Figure 8:
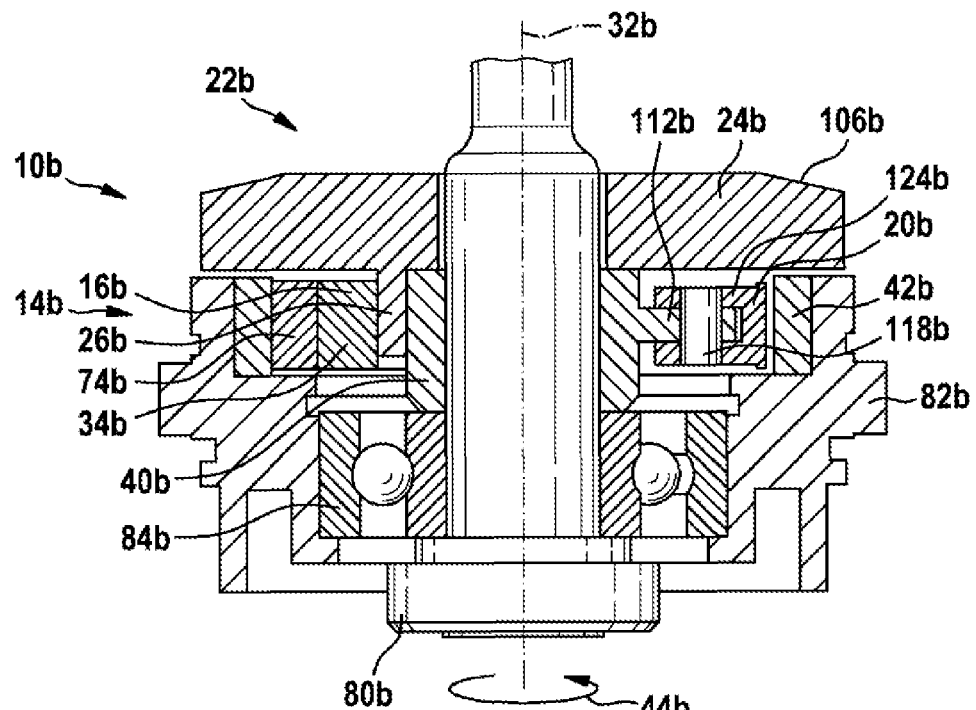
FIG. 8 shows a sectional view of an alternative embodiment of a power-tool braking device according to the disclosure, in a schematic representation.
Figure 9:
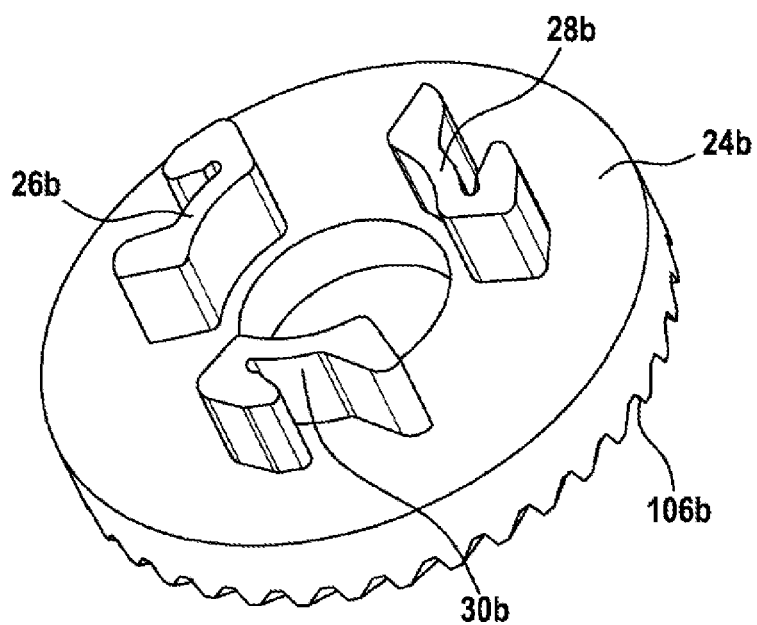
FIG. 9 shows a detail view of an alternative output element of an alternative output unit of an alternative power-tool braking device according to the disclosure, in a schematic representation.

FIG. 8 shows an alternative power-tool braking device 10b, which can be mounted on a transmission housing of an angle grinder (not represented in greater detail here) that is realized in a manner similar to the angle grinder 52a described in the description of FIGS. 1 to 7. The power-tool braking device 10b comprises a braking unit 14b and an output unit 22b. The braking unit 14b and the output unit 22b are of a structure that is at least substantially similar to that of the braking unit 14a and output unit 22a described in the description of FIGS. 1 to 7. The braking unit 14b thus has three movably mounted braking elements 16b, 18b (only two are represented in FIG. 8), and the output unit 22b has an output element 24b. The braking unit 14b additionally has three actuating elements 26b, 28b, 30b (FIG. 9), which are provided to move the braking elements 16b, 18b, at least in one operating state, at least substantially perpendicularly in relation to a rotation axis 32b of the output element 24b. The actuating elements 26b, 28b, 30b are integral with the output element 24b realized as a ring gear. Furthermore, the braking unit 14b has a counter-braking element 42b, which is realized as a brake drum. The counter-braking element 42b is fixed, by means of a press fit, in a bearing flange 82b of the output unit 22b. Reference may be made to the description of FIGS. 1 to 7 in respect of a mode of functioning of the braking unit 14b and of the output unit 22b.

Figure 10:
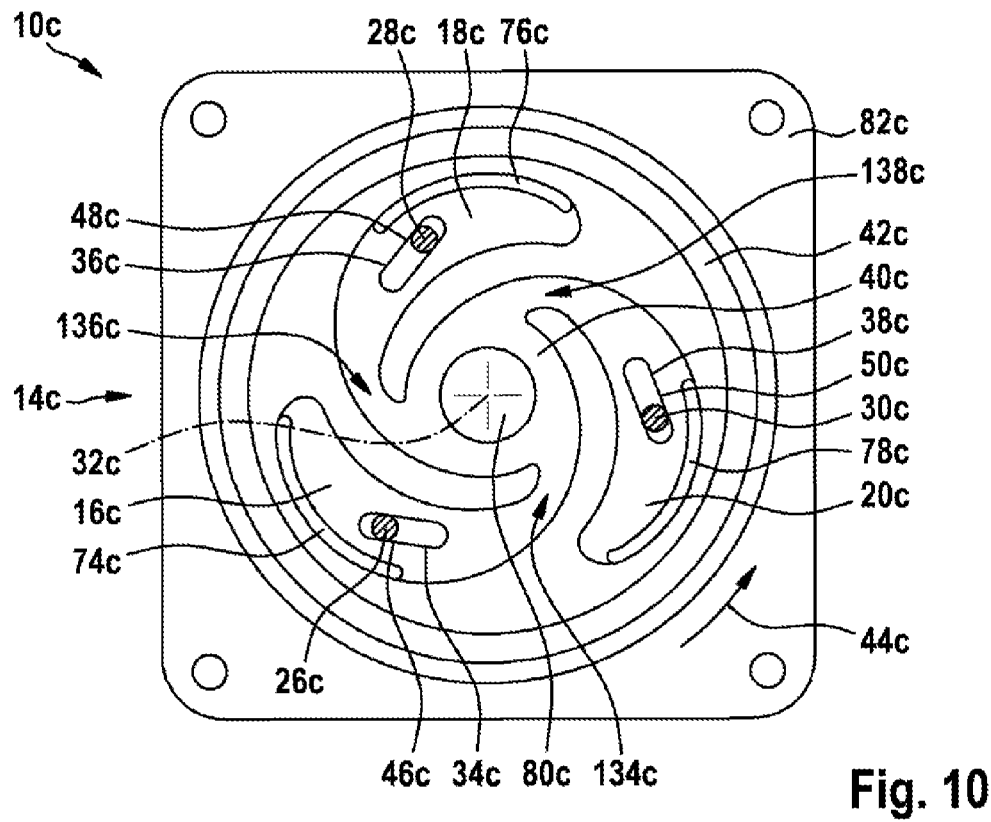
FIG. 10 shows a detail view of a further alternative embodiment of a power-tool braking device according to the disclosure, in a schematic representation.
Figure 11:
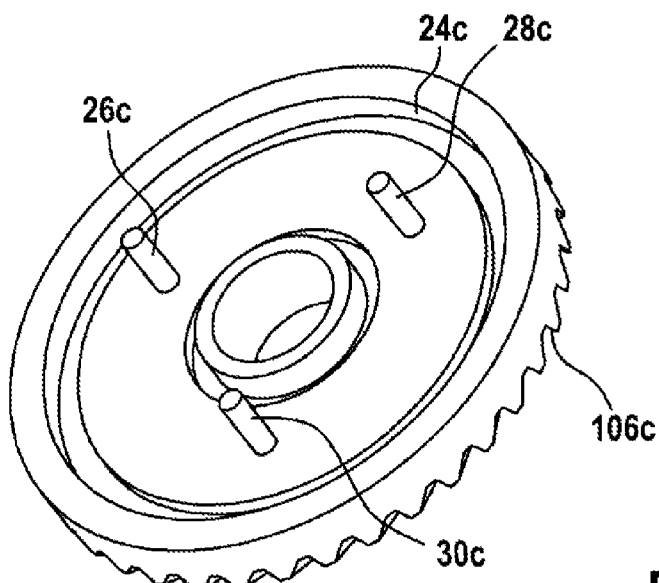
FIG. 11 shows a detail view of an output element of the alternative power-tool braking device, in a schematic representation.

FIG. 10 shows a further alternative power-tool braking device 10c, which can be mounted on a transmission housing of an angle grinder (not represented in greater detail here) that is realized in a manner similar to the angle grinder 52a described in the description of FIGS. 1 to 7. The power-tool braking device 10c comprises a braking unit 14c and an output unit 22. The output unit 22c is of a structure that is at least substantially similar to that of the output unit 22a described in the description of FIGS. 1 to 7. The output unit 22c thus has an output element 24c realized as a ring gear. The output element 24c realized as a ring gear is disposed, by means of a clearance fit, on an output shaft of the output unit 22c, which output shaft is rotatably mounted and realized as a spindle 80c.

The braking unit 14c has three movably mounted braking elements 16c, 18c, 20c. Furthermore, the braking unit 14c has a counter-braking element 42c, realized as a brake drum. The counter-braking element 42c is fixed, by means of a press fit, in a bearing flange 82c of the output unit 22c. In addition, the braking unit 14c has three actuating elements 26c, 28c, 30c, which are provided to move the braking elements 16c, 18c, 20c, at least in one operating state, at least substantially perpendicularly in relation to a rotation axis 32c of the output element 24c. For this purpose, the braking unit 14c has a cam mechanism, which has three cam members 46c, 48c, 50c, which are provided to act in combination with the actuating elements 26c, 28c, 30c for the purpose of moving the braking elements 16c, 18c, 20c. The cam members 46c, 48c, 50c are disposed on the braking elements 16c, 18c, 20c. The cam members 46c, 48c, 50c are realized as cam-ways. The cam-ways in this case are constituted by control recesses made in the braking elements 16c, 18c, 20c. It is also conceivable for the cam members 46c, 48c, 50c to be of another design, considered appropriate by persons skilled in the art, such as, for example, rib-type extensions, etc. The cam members 46c, 48c, 50c thus constitute operating elements 34c, 36c, 38c of the braking elements 16c, 18c, 20c. The actuating elements 26c, 28c, 30c engage in the cam members 46c, 48c, 50c. In addition, the actuating elements 26c, 28c, 30c are integral with the output element 24c. The actuating elements 26c, 28c, 30c in this case are realized in the form of pins, and extend away from the output element 24c (FIG. 11), on a side that faces away from a toothing 106c of the output element 24c, along a direction running at least substantially parallelwise in relation to the rotation axis 32c of the output element 24c.

The braking elements 16c, 18c, 20c are integral with a driver element 40c of the braking unit 14c. The driver element 40c is connected to the spindle 80c of the output unit 22c in a rotationally fixed manner. By means of an elastic portion 134c, 136c, 138c of the driver element 40c, the braking elements 16c, 18c, 20c are each mounted such that they can be pivoted relative to a region of the driver element 40c that is in direct contact with the spindle 80c. It is also conceivable, however, for the braking elements 16c, 18c, 20c to be connected to each other by means of a film hinge and/or another articulated connection considered appropriate by persons skilled in the art. In addition, by means of the elastic portions 134c, 136c, 138c, the braking elements 16c, 18c, 20c are connected in a materially bonded manner to the region of the driver element 40c that is in direct contact with the spindle 80c.

Owing to the fact that the actuating elements 26c, 28c, 30c engage in the cam members 46c, 48c, 50c, the fact that the braking elements 16c, 18c, 20c are pivotally mounted by means of the elastic portions 134c, 136c, 138c, and owing to a relative motion of the output element 24c and driver element 40c, the braking elements 16c, 18c, 20c are moved, in a manner substantially similar to that of the braking elements 16a, 18a, 20a described in the description of FIGS. 1 to 7, in the direction of a counter-braking element 42c of the braking unit 14c, into a braking position, and/or in the direction of the spindle 80c, into a release position.

The invention claimed is:

1. A power-tool braking device of a portable power tool, comprising:
   a housing;
   a drive unit supported by the housing;
   at least one output unit including at least one output element configured to be rotationally driven relative to the housing by the drive unit about a rotation axis;
   at least one mechanical braking unit including at least one movably mounted braking element configured to move to a release position that enables rotation of the output element and to move to a braking position for braking rotation of the output element
   wherein the braking unit has at least one actuating element configured (i) to engage the at least one braking element to secure the at least one braking element in the release position in response to the drive unit rotationally driving the at least one output element, and (ii) to release the at least one braking element in response to the drive unit ceasing to rotationally drive the at least one output element, such that the at least one braking element is movable to the braking position.

2. The power-tool braking device as claimed in claim 1, wherein, to engage the braking element, the actuating element acts in combination, in a form-fitting manner, with a release element of the braking element.

3. The power-tool braking device as claimed in claim 1, wherein the actuating element is connected to the output element in a rotationally fixed manner.

4. The power-tool braking device as claimed in claim 1, wherein:
   the braking unit has at least one driver element on which the braking element is pivotally mounted, and
   the at least one driver element is separate from the at least one output element.

5. The power-tool braking device as claimed in claim 1, wherein:
   the braking unit has at least one counter-braking element that is rotationally fixed in position relative to the housing, the counter-braking element configured to at least partially surround the braking element along a circumferential direction, as viewed in a plane running perpendicularly in relation to the rotation axis, and
   the braking unit prevents the at least one braking element from braking the rotation of the output element by maintaining the at least one braking element in a position that is radially spaced apart from the at least one counter-braking element.

6. The power-tool braking device as claimed in claim 5, wherein the counter-braking element is configured as a brake drum.

7. The power-tool braking device as claimed in claim 1, wherein the braking unit comprises at least one cam mechanism, the cam mechanism having at least one cam member configured to act in combination with the actuating element to move the braking element toward the rotation axis.

8. The power-tool braking device as claimed in claim 7, wherein the cam member is disposed on the braking element.

9. The power-tool braking device as claimed in claim 1, wherein the output element is configured as a ring gear.

10. The power-tool braking device as claimed in claim 1, wherein the power-tool braking device is configured as a hand-held power tool braking device.

11. The power-tool braking device as claimed in claim 1, wherein
   in response to the drive unit ceasing to drive the at least one output element, inertia of the at least one mechanical braking unit causes the at least one braking element to move to a position configured to brake the rotation of the at least one output element.

12. A power-tool braking device of a portable power tool, comprising:
   an output unit including an output element, the output element configured to be driven rotationally by a drive unit of the power tool, such that the output element defines a rotation axis;
   at least one movably mounted braking element that is rotatable about the rotation axis relative to the output unit and that is configured to brake rotation of the output element, the at least one braking element configured, at least in one operating state, to move at least substantially perpendicularly in relation to the rotation axis; and
   a mounting plate connected to the output element in a rotationally fixed manner and including at least one actuating element, when the output element is driven rotationally by the drive unit, the at least one actuating element moves the at least one braking element perpendicularly toward the rotation axis to prevent the at least one braking element from braking the rotation of the output unit.

13. The power-tool braking device as claimed in claim 12, wherein, in the at least in one operating state, the at least one actuating element acts in combination, in a form-fitting manner, with a release element of the at least one braking element to move the at least one braking element perpendicularly toward the rotation axis.

14. The power-tool braking device as claimed in claim 12, wherein the at least one actuating element is connected to the output element in a rotationally fixed manner.

15. The power-tool braking device as claimed in claim 12, wherein the braking unit has at least one driver element on which the at least one braking element is pivotally mounted.

16. The power-tool braking device as claimed in claim 12, wherein:
   the braking unit has at least one counter-braking element, which at least partially surrounds the braking element along a circumferential direction, as viewed in a plane running perpendicularly in relation to the rotation axis of the output element, and
   the braking unit prevents the at least one braking element from braking the rotation of the output element by maintaining the at least one braking element in a position that is radially spaced apart from the at least one counter-braking element.

17. The power-tool braking device as claimed in claim 16, wherein the counter-braking element is configured as a brake drum.

18. The power-tool braking device as claimed in claim 12, wherein the braking unit comprises at least one cam mechanism, the cam mechanism having at least one cam member configured to act in combination with the at least one actuating element to move the at least one braking element.

* * * * *